United States Patent
Dabbous et al.

(10) Patent No.: US 7,809,959 B2
(45) Date of Patent: Oct. 5, 2010

(54) COUNTERMEASURE METHOD IN A MICROCIRCUIT, MICROCIRCUIT THEREFORE AND SMART CARD COMPRISING SAID MICROCIRCUIT

(75) Inventors: Nora Dabbous, Bologna (IT); David Naccache, Paris (FR)

(73) Assignee: Gemalto SA, Meudon (FR)

( * ) Notice: Subject to any disclaimer, the term of this patent is extended or adjusted under 35 U.S.C. 154(b) by 1760 days.

(21) Appl. No.: 10/257,411

(22) PCT Filed: Apr. 18, 2001

(86) PCT No.: PCT/FR01/01196

§ 371 (c)(1),
(2), (4) Date: Oct. 11, 2002

(87) PCT Pub. No.: WO01/84491

PCT Pub. Date: Nov. 8, 2001

(65) Prior Publication Data

US 2004/0039931 A1 Feb. 26, 2004

(30) Foreign Application Priority Data

Apr. 28, 2000 (FR) .................................. 00 05531

(51) Int. Cl.
*H04L 9/32* (2006.01)
(52) U.S. Cl. ..................................................... 713/194
(58) Field of Classification Search ......... 713/189–194; 380/28–30, 46, 47, 1; 708/250
See application file for complete search history.

(56) References Cited

U.S. PATENT DOCUMENTS

| | | | | | |
|---|---|---|---|---|---|
| 4,932,053 | A | * | 6/1990 | Fruhauf et al. | 380/252 |
| 5,404,402 | A | * | 4/1995 | Sprunk | 713/189 |
| 5,944,833 | A | * | 8/1999 | Ugon | 713/400 |
| 6,195,752 | B1 | * | 2/2001 | Pfab | 713/168 |
| 6,327,661 | B1 | * | 12/2001 | Kocher et al. | 713/193 |
| 6,419,159 | B1 | * | 7/2002 | Odinak | 235/492 |
| 6,594,760 | B1 | * | 7/2003 | Ryan et al. | 713/189 |
| 6,615,354 | B1 | * | 9/2003 | Ohki et al. | 713/193 |
| 6,839,847 | B1 | * | 1/2005 | Ohki et al. | 713/194 |
| 6,907,526 | B2 | * | 6/2005 | Tanimoto et al. | 713/174 |
| 2003/0005206 | A1 | * | 1/2003 | Kniffler | 710/305 |

OTHER PUBLICATIONS

"Soft Microcontroller" Dallas Semiconductor Corp., Oct. 6, 1993, pp. 1-3, 7,8, 73, 77-80, 152-156, 229, 290-292.*
Cohen, Frederick B., *Operating system protection through program evolution*, Computers & Security, vol. 12, No. 6, Oct. 1993, pp. 565-584, Oxford, GB.

* cited by examiner

*Primary Examiner*—Beemnet W Dada
(74) *Attorney, Agent, or Firm*—Buchanan Ingersoll & Rooney PC

(57) ABSTRACT

A countermeasure method for a microcontroller that executes sequences of instructions. The instructions are executed according to a pipeline method. At least one waiting time is randomly introduced between two consecutive instructions and/or within at least one instruction. The method is implemented by the electronics of the microcontroller rather than by software addition.

13 Claims, 3 Drawing Sheets

US 7,809,959 B2

COUNTERMEASURE METHOD IN A MICROCIRCUIT, MICROCIRCUIT THEREFORE AND SMART CARD COMPRISING SAID MICROCIRCUIT

This disclosure is based upon French Application No. 00/05531, filed on Apr. 28, 2000 and International Application No. PCT/FR01/01196, filed Apr. 18, 2001, the contents of which are incorporated herein by reference.

BACKGROUND OF THE INVENTION

The present invention relates to a countermeasure method in a microcircuit.

It also relates to a microcircuit implementing the method and portable media of the smart card type having such a microcircuit.

It should be noted that a microcircuit for portable devices such as smart cards has an architecture formed around a processor (or microprocessor) comprising a controller and an arithmetic and logic unit (ALU) connected by a bus to memories, including a non-volatile program memory which contains the sensitive data item or items (secret keys) of a cryptography algorithm for example. The controller manages the input/output signals I/O (instructions, addresses, data) and the arithmetic and logic unit performs arithmetic operations on the data on command of the controller.

Such microcircuits are used in smart cards for certain applications, for example applications for accessing certain data banks, banking applications, remote charging applications, for example for television, petrol dispensing or passing through motorway tolls.

The invention is applicable most particularly to the security of sensitive data in media such as smart cards. It concerns secret data manipulated by the processor of the microcircuit and liable to pass over the bus connecting the memories to this processor.

The invention is applicable to the security of secret information such as the secret code of the user of a smart card or the electronic keys used in cryptographic calculation operations for the encryption and/or authentication and/or electronic signing of messages.

The invention is applicable in particular in the case of the implementation of secret key cryptography algorithms or of so-called public key algorithms. Such algorithms are used in applications where the access to services or to data is strictly controlled.

Amongst the secret key cryptography algorithms there can be cited the DES (Data Encryption Standard) algorithm. Other secret key algorithms exist, like the RC5 algorithm or the COMP128 algorithm. This list is of course not exhaustive.

Amongst the public key cryptography algorithms there can be cited RSA (Rivest Shamir and Adelman), El Gamal, Schnorr, Fiat Shamir, or DSA or DSS.

Briefly and in general terms, the aim of these algorithms is to perform cryptographic calculations from a host system (server, cash dispenser, etc.) and the secret key or public and secret keys contained in the card, and to supply in return to the host system an encrypted message or to allow an authentication of the microcircuit (of the card), or to sign messages.

The entire security of these cryptography algorithms relies on the fact of being able to keep secret the data which must remain so. In the case of cryptographic algorithms, the secret key or keys cannot be deduced solely from knowledge of the information exchanged between the card and the outside world.

However, it has appeared that from external attacks, based on current consumptions or a differential current consumption analysis when the cryptography processor or the processor of a smart card performs calculation operations entailing the manipulation of secret data, such manipulations allow ill-intentioned third parties to find the secret key contained in this card by carrying out attacks referred to as DPA (Differential Power Analysis) attacks.

The principle of these DPA attacks relies on the fact that the current consumption of the processor executing instructions varies according to the data manipulated.

In particular, when an instruction executed by the processor requires manipulation of a data item bit by bit, there are two different current profiles depending on whether this bit is equal to "1" or "0". Typically, if the processor is manipulating a "0", there is at that execution instant a first amplitude of the consumed current and, if the processor is manipulating a "1", there is a second amplitude of the consumed current, different from the first.

Thus the DPA attack exploits the difference in the current consumption profile in the card during execution of an instruction according to the value of the bit manipulated. Simplified, the course of a DPA attack consists in identifying one or more particular periods in the progression of the algorithm comprising the execution of at least one instruction manipulating data items bit by bit; of plotting a very large number N of current consumption curves during this or these periods, one curve per different message to which the algorithm is applied; of predicting, for each curve, the value taken by one bit of the data item for an assumption on a subkey, that is to say on at least part of the secret key, which allows the prediction to be made; and of sorting the curves according to the corresponding Boolean selection function: a first bundle of curves is obtained for which the prediction is equal to "1" and a second bundle of curves is obtained for which the prediction is equal to "0". By performing a differential analysis of the mean current consumption between the two bundles of curves obtained, an information signal DPA(t) is obtained.

If the subkey assumption is not true, each bundle in actual fact comprises as many curves corresponding to manipulation of a "1" as curves manipulating a "0". The two bundles are therefore equivalent in terms of current consumption and the information signal is substantially zero. If the subkey assumption is true, one bundle actually comprises the curves corresponding to manipulation of a "1" and the other bundle actually comprises the curves corresponding to manipulation of a "0": the information signal DPA(t) obtained is not zero: it comprises consumption peaks corresponding to manipulation by the processor of the bit on which the sort was based. These peaks have an amplitude corresponding to the difference in consumption by the processor depending on whether it is manipulating a "1" or a "0". Thus, gradually, it is possible to discover all or part of the secret key contained in a microcircuit.

There are numerous algorithms for the execution of which the processor or an associated calculation unit (cryptoprocessor) has to perform bit-by-bit data manipulations at certain moments.

This is the case in particular, as has been said, for cryptographic algorithms. By analysing the current consumption during the execution of these bit-by-bit manipulations, it is possible to find the value of at least certain bits of the manipulated data item. The knowledge of this data item can provide information on intermediate results obtained during execution of the cryptography algorithm, which in their turn can make it possible to find at least some of the bits of the secret key used.

The applicant realised that such an attack can be carried out from observing the current consumption variations related to transitions of binary values on the microcircuit bus. This is because the applicant observed that the change of state between two bits of the same significance from one data item to another would cause a higher consumption than in the case where there is no change of state. Thus, transitions leave a signature for the data which flow on the bus. This situation is of course very prejudicial where these data are secret data.

SUMMARY OF THE INVENTION

The aim of the present invention is to solve this problem.

Its object is to protect the data on which bit-by-bit manipulations are performed, by applying thereto a countermeasure, that is to say interference, so that analysis of the current consumption during transitions from one data item to the next passing over the bus reveals no information on these data items: the information signal DPA(t) will always be the same in DPA attacks.

As claimed, the invention relates to a countermeasure method in a microcircuit comprising a processor capable of performing operations, one of which consists in manipulating at least one secret data item, at least one non-volatile memory containing the secret data item or items, and at least one working memory, said memories being connected by a bus to said processor, principally characterised in that the method comprises the injection onto the bus of a number of random data items between data items originating from operations performed by the processor.

According to another characteristic, the method consists in activating the injection onto the bus of a number of random data items during a period during which the secret data item or items are being manipulated, and of inhibiting the injection of said random data items outside these periods.

According to another characteristic, the operation consisting in manipulating a secret data item is implemented by a cryptographic algorithm.

The cryptography algorithm can be a secret key algorithm.

This cryptography algorithm can alternatively be a public key algorithm.

The secret data item can be a personal identification code.

The invention also relates to a microcircuit for a portable device of the smart card type, comprising a processor capable of performing operations, one of which consists in manipulating at least one secret data item, at least one non-volatile memory comprising the secret data item or items, and at least one working memory, connected by a bus to said processor, principally characterised in that it comprises a random data generator, and a multiplexer comprising an input connected to the output of the random data generator which is connected to the input/output bus of the processor in order to inject random data items onto this bus on command of the processor.

The random data generator is activated by a clock signal with a frequency higher than that of the processor.

The clock signal can be a multiple of the processor clock signal which can be generated internally (internally to the processor) or come from outside (from contact pads of the smart card in which the microcircuit is installed).

The microcircuit has a logic circuit capable of supplying said clock signal which is a multiple of the processor clock signal.

When the microcircuit has a number of buses, the means for injecting random data items are implemented by a macroinstruction.

The invention also relates to a smart card, comprising a microcircuit as has just been presented.

BRIEF DESCRIPTION OF THE DRAWINGS

Other particular features and advantages of the invention will emerge clearly from a reading of the description produced below and which is given by way of a non-limitative example and with reference to the accompanying drawings in which.

DETAILED DESCRIPTION

Figure 1:
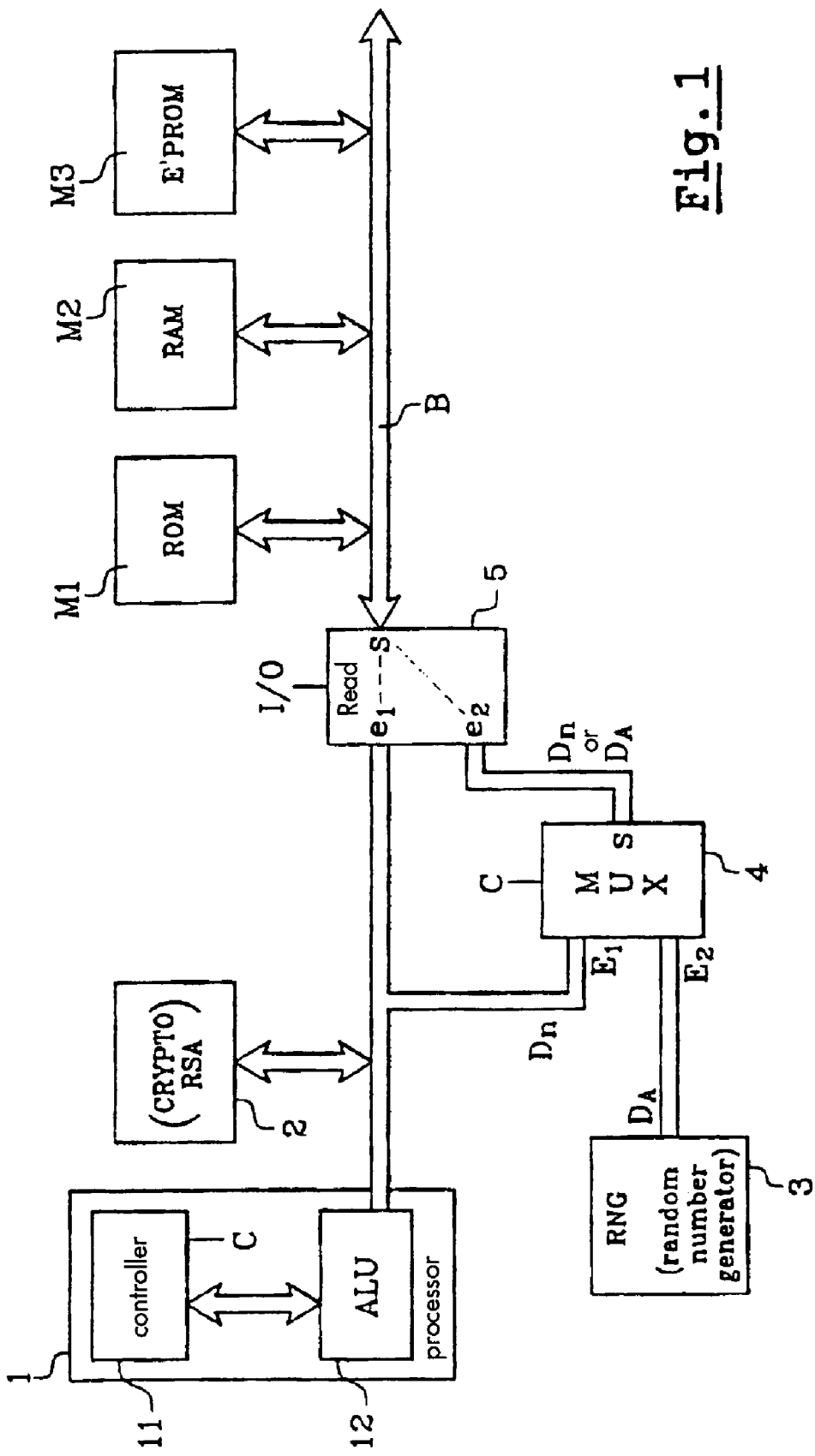
FIG. 1 depicts a simplified architecture of a microcircuit capable of implementing the method according to the invention.

FIG. 1 depicts a simplified microcircuit, that is to say-only the elements necessary for understanding the invention.

In the case of an installation in a smart card, the microcircuit has the architecture of the micromodule of the card that is to say it has: a main processing unit 1 (called the processor) comprising a controller 11, one or more buses for connecting the unit 1 to associated memories consisting of at least one program memory M1 (non-volatile of ROM type), at least one working memory M2 (of RAM type), and at least one electrically programmable program memory M3 (of EEPROM type). The microcircuit can also have a calculation unit 2 (cryptoprocessor) for implementing modular exponentiation calculations as is the case for example in the case of execution of the RSA (Rivest Shamir Adelman) public key cryptographic algorithm.

For implementing the countermeasure method according to the invention, the microcircuit shown schematically in this FIG. 1 also has a random number generator 3 activated by a clock signal H (FIG. 2) and a multiplexer 4 activated by a signal C controlling its output S. The microcircuit also has a system 5 for management of the information flowing on the bus B (of the type of a multiplexer with two inputs e1, e2 and one output s) controlled by the controller 11. In the case of a read from a memory, the system 5 makes it possible to directly connect the arithmetic and logic unit 12 to the memories M1, M2, M3; in the case of a write to a memory the output of the multiplexer 4 goes onto the bus B.

The controller 11 of the microcircuit can be associated with a cryptographic operator 2 as already specified and manipulate one or more secret data items.

For simplification, the case will be taken of a single manipulated secret data item (which is the case for example in the implementation of a secret key algorithm or of a PIN code (Personal Identifier Code)). This data item is stored in a secure manner in the non-volatile program memory M1 associated with the processor 11.

During execution of a cryptography operation or verification of the identification code (PIN), the processor will, according to the invention, perform one or more interrupts so as to inject random data items onto the bus (a bus over which the secret data items are then liable to pass).

In fact, during the execution, initiated by the processor, of an instruction which comprises for example the writing of a secret data item, the latter will then pass over the bus B in order to go into the working memory M2 with a view to the processing to be performed with this data item. A series of data items will consequently pass over the bus B for each operation executed; these data items are commands and data "useful" for the processing performed. According to the method of the invention, the processor is capable of issuing an interrupt which can be triggered by the secret data manipulation program itself (in this case the cryptography program), having the aim of interrupting the execution of the instruction in progress, of saving the context in the registers and of triggering the insertion of random data items (generated by the generator 3) onto the bus B. The signal interrupting the execution of the instruction in progress can be used as the control signal C for the multiplexer 4.

FIGS. 2A to 2G illustrate the operating signals of the microcircuit.

Figure 2A:
FIGS. 2A to 2G depict the operating signals of the microcircuit.

The processor clock signal CLK is depicted in FIG. 2A.

Figure 2B:

FIG. 2B illustrates an example of a clock signal H for controlling the random generator 3.

A clock frequency H higher than the processor clock CLK is chosen so that a number of random data items $DA_1$, $DA_n$ can be injected between the instant at which the execution of an instruction is interrupted and its resumption. These random data items are thus injected between data items transmitted by the bus B between these two instants. The aim of the random data items is to randomly reload or unload the bus.

The insertion of a number of data items makes it possible to obtain the expected result.

A clock H faster than the processor clock CLK, for example a multiple thereof, is chosen so as to send at least two random data items.

Figure 2C:
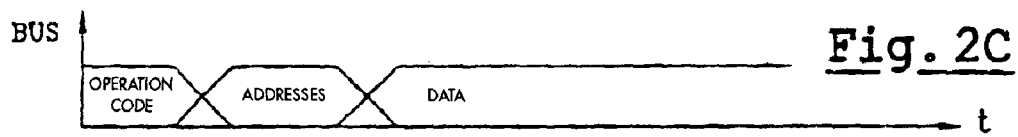

The data items, whether commands or data to be processed, are illustrated on the graph of the bus in FIG. 2C.

Figure 2D:

FIG. 2D illustrates the progression of the execution of an instruction and its interruption upon receipt of the interrupt signal. This interrupt makes it possible to generate the signal C controlling the output of the multiplexer, illustrated in FIG. 2E.

Figure 2E:
Figure 2F:
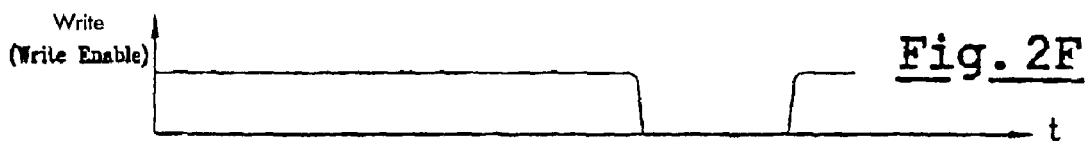

The write control signal issued by the processor is illustrated in FIG. 2F.

Figure 2G:
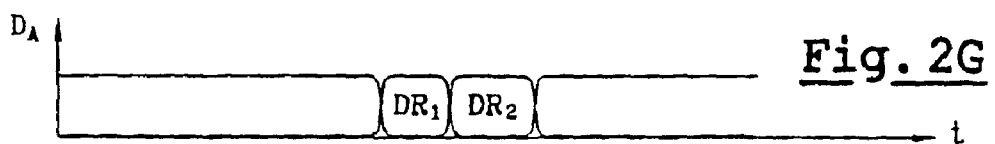

FIG. 2G illustrates the data items DA generated by the random generator 3.

FIG. 2E illustrates an example of a control signal C for activating the multiplexer 3. According to the example illustrated, when the signal C is at 0, the multiplexer delivers at its output S the signal received on its input E1, and when the signal C is at 1, it delivers the data received on its input E2; this signal C is, according to this example, at 1 in the presence of an instruction execution interrupt issued by the processor.

The input E1 of the multiplexer 4 corresponds to the output data of the processor (ALU).

The data received on the input E2 are the data issued by the generator 3.

Figure 3:
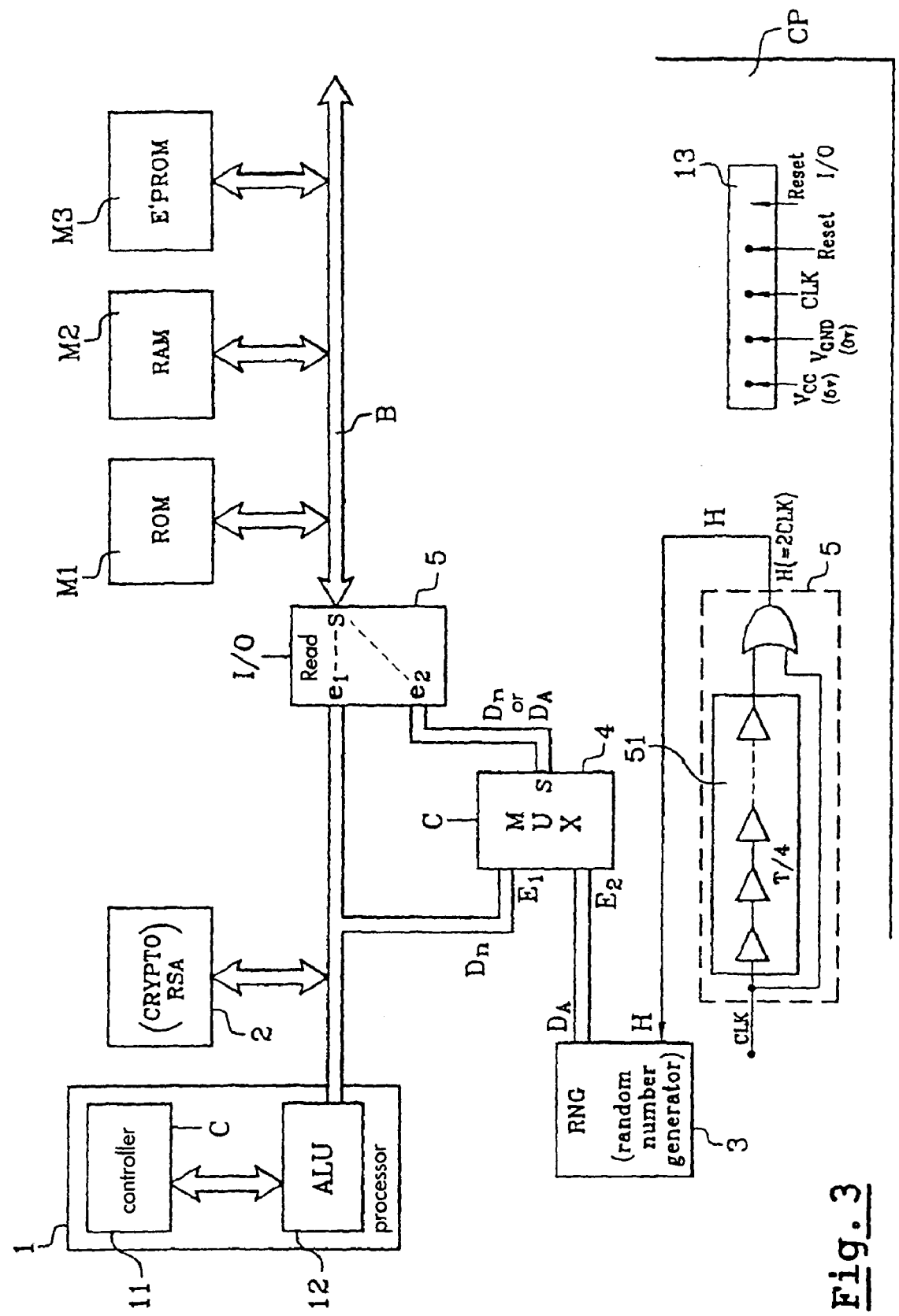
FIG. 3 depicts a detailed implementation diagram of one embodiment of the microcircuit according to the invention.

FIG. 3 depicts a detailed example of one embodiment of the invention.

When the microcircuit is installed in a smart card it also has an interface 13 for communication with the outside world depicted schematically in this figure. This interface comprises the contact pads of the smart card intended to receive the clock signal CLK, the voltage signals $V_{cc}$ and $V_{GND}$, a reset to zero signal Reset, and the input/output signals I/O. It also has an asynchronous transmission unit.

In the implementation which is going to be described, the clock H is obtained from a logic circuit 50 multiplying the clock signal CLK. This circuit 50 consists for example of gates 51 in series introducing a delay. The delay can be T/4 (T being the period of the clock CLK), and makes it possible in this case to inject at least two random data items between two data items passing over the bus.

The control C is generated by the processor programmed to that end.

A logic circuit could be provided to that end.

When the microcircuit has a number of buses, the functions which have just been described can be implemented not by circuits, but by a macro-instruction provided to that end.

The invention claimed is:

1. A countermeasure method in a microcircuit comprising a processor capable of performing operations, one of which consists in manipulating at least one secret data item, at least one non-volatile memory containing the secret data item, and at least one working memory, said memories being connected by a bus to said processor, said method comprising the step of injecting a plurality of random data items onto the bus between data items originating from operations performed by the processor, in response to an interrupt generated during the manipulation of the at least one secret data item by the processor internally, to randomly reload or unload the bus.

2. A countermeasure method in a microcircuit according to claim 1, wherein a number of random data items are injected onto the bus during periods in which the secret data item is being manipulated, and the injection of said random data items is inhibited outside these periods.

3. A countermeasure method according to claim 1, wherein the manipulation of a secret data item is implemented by a cryptographic algorithm.

4. A countermeasure method according to claim 3, wherein the cryptographic algorithm is a secret key algorithm.

5. A countermeasure method according to claim 3, wherein the cryptographic algorithm is a public key algorithm.

6. A countermeasure method according to claim 1, wherein the secret data item is a personal identification code.

7. A microcircuit for a portable device of the smart card type, comprising a processor capable of performing operations, one of which includes manipulating at least one secret data item, at least one non-volatile memory storing the secret data item, at least one working memory, connected by a bus to said processor, and means for injecting a plurality of random data items onto said bus in response to an interrupt generated during the manipulation of the at least one secret data item by the processor internally.

8. A microcircuit for a portable device according to claim 7, wherein the means for injecting random data items onto the bus comprise a random data generator and a multiplexer having an input connected to the output of the random data generator and an output which is connected to the bus.

9. A microcircuit for a portable device according to claim 8, wherein the random data generator is activated by a clock signal with a frequency higher than that of the processor.

10. A microcircuit for a portable device according to claim 9, wherein the clock signal is a multiple of the processor clock signal.

11. A microcircuit for a portable device according to claim 9, further including a logic circuit capable of supplying said clock signal as a multiple of the processor clock signal.

12. A microcircuit for a portable device according to claim 7, wherein the microcircuit has a number of buses, and the means for injecting random data items are implemented by a macro-instruction.

13. A smart card having a microcircuit according to claim 7.

* * * * *